United States Patent [19]

Ebisawa

[11] Patent Number: 5,289,207
[45] Date of Patent: Feb. 22, 1994

[54] ENHANCED DISCHARGE RECOVERY FOR INK JET RECORDING APPARATUS

[75] Inventor: Isao Ebisawa, Tokyo, Japan

[73] Assignee: Canon Kabushiki Kaisha, Tokyo, Japan

[21] Appl. No.: 745,480

[22] Filed: Aug. 14, 1991

[30] Foreign Application Priority Data

Aug. 17, 1990 [JP] Japan .................................. 2-215927
Aug. 12, 1991 [JP] Japan .................................. 3-201907

[51] Int. Cl.$^5$ .................................. G01D 15/16
[52] U.S. Cl. .................................. 346/140 R; 346/1.1
[58] Field of Search .................................. 346/1.1, 140 R

[56] References Cited

U.S. PATENT DOCUMENTS

| | | | |
|---|---|---|---|
| 4,313,124 | 1/1982 | Hara .................................. | 346/140 R |
| 4,345,262 | 8/1982 | Shirato et al. .................................. | 346/104 R |
| 4,459,600 | 7/1984 | Sato et al. .................................. | 346/140 R |
| 4,463,359 | 7/1984 | Ayata et al. .................................. | 346/1.1 |
| 4,558,333 | 12/1985 | Sugitani et al. .................................. | 346/140 R |
| 4,666,005 | 8/1984 | Yoshimura .................................. | 346/140 R |
| 4,723,129 | 2/1988 | Endo et al. .................................. | 346/1.1 |
| 4,740,796 | 4/1988 | Endo et al. .................................. | 346/1.1 |
| 4,745,414 | 5/1988 | Okamura et al. .................................. | 346/140 R |
| 4,947,190 | 8/1990 | Mizusawa et al. .................................. | 346/140 R |
| 4,977,459 | 12/1990 | Ebinuma et al. .................................. | 358/296 |
| 4,999,643 | 3/1991 | Terasawa .................................. | 346/1.1 |
| 5,040,000 | 8/1991 | Yokoi .................................. | 346/140 R |
| 5,086,305 | 2/1992 | Terasawa .................................. | 346/1.1 |
| 5,136,307 | 8/1992 | Uchida et al. .................................. | 346/140 R X |

FOREIGN PATENT DOCUMENTS

| | | |
|---|---|---|
| 0259193 | 3/1988 | European Pat. Off. . |
| 0348234 | 12/1989 | European Pat. Off. . |
| 2843064 | 7/1979 | Fed. Rep. of Germany . |
| 54-056847 | 5/1979 | Japan . |
| 59-123670 | 7/1984 | Japan . |
| 59-138461 | 8/1984 | Japan . |
| 60-071260 | 4/1985 | Japan . |
| 63-295267 | 12/1988 | Japan . |
| 2169855 | 7/1986 | United Kingdom . |

*Primary Examiner*—A. T. Grimley
*Assistant Examiner*—Sandra L. Brasé
*Attorney, Agent, or Firm*—Fitzpatrick, Cella, Harper & Scinto

[57] ABSTRACT

A recovery method, for an ink jet recording apparatus having a recording head for recording by discharging the ink with bubbles formed by thermal energy applied to a heat acting area and an energy supplying device for providing the thermal energy, includes a compulsory recovery mode in which more than $10^3$ predischarges are performed by supplying energy exceeding 1.48 times the minimum energy Eo necessary for producing the bubbles.

17 Claims, 16 Drawing Sheets

ALL NOZZLES

ALL NOZZLES

ALL NOZZLES

FIG.11

★★★ HEAD CLEANING PRINT ★★★
★★START★★ line 50 ☐☐☐☐☐☐☐☐☐☐☐
49 ☐☐☐☐☐☐☐☐☐☐☐
48 ☐☐☐☐☐☐☐☐☐☐☐
47 ☐☐☐☐☐☐☐☐☐☐☐
46 ☐☐                    ☐☐

3 ☐☐                     ☐☐
2 ☐☐☐☐☐☐☐☐☐☐☐
1 ☐☐☐☐☐☐☐☐☐☐☐
★★END★★

ENHANCED DISCHARGE RECOVERY FOR INK JET RECORDING APPARATUS

BACKGROUND OF THE INVENTION

1. Field of the Invention

The present invention relates to an ink jet recording apparatus mountable on or connectable to a copying machine, a printer, communication equipment, or information equipment and a recovery method of a recording head applicable thereto. Particularly, the present invention is effective for a compulsory recovery mechanism (including either of electrical or mechanical) in a device having heat generating elements for forming bubbles in the ink by generating thermal energy and a driving circuit for driving them with an electrical pulse signal.

2. Related Background Art

As fundamental inventions for forming bubbles with thermal energy, there are those such as driving a heat generating resistor with an electrical pulse signal, or using optical energy, and in addition, having elements for converting the optical energy to heat, as described in U.S. Pat. No. 4,740,796 or West German Offenlegungshrift No. 2,843,064.

In the field of ink jet recording, the recovery process called a predischarge is performed as a process for discharging the ink from an outlet in other than recording. As the invention for accomplishing this predischarge with an appropriate exhaust of ink including the in-recording or waiting, there is known U.K. Patent No. 2,169,855. In this official gazette, the recovery performed during usual recording as the predischarge is specifically described and stated expressly as the invention.

On the other hand, for the recovery of a recording head in an extreme state, the recovery using a pump ordinarily called suction recovery has been put to practical use, but there is a disadvantage in accomplishing a smaller, lighter or less expensive apparatus because of its complex construction. Also, in U.S. Pat. No. 4,977,459 disclosing that a proper recovery processing is executed in accordance with the state of a recording head, the final compulsory recovery adopts suction recovery, but not predischarge.

Also, a conventional predischarge is performed in an ordinary discharge condition for recording or its similar condition because it is relatively frequently operated. This is to extend the life of heat generating elements for the recording head. The predischarged ink is discharged toward an ink absorbing member, but in addition, specific paper, recording sheet, foam material and a cap for recording head are known as the ink receiving member.

However, particularly, in the bubble jet recording apparatus that forms flying ink droplets by producing ink bubbles by the use of the thermal energy among such ink jet recording apparatuses, the recording quality tends to degrade in a long term of recording.

Thus, as its cause, it is known that dyes or contaminants in the ink are solidified on a face of the heater which is an electricity-heat converter for supplying the thermal energy to the ink, due to the heat, and accumulated thereon. Therefore, large efforts have been made to remove contaminants, such as refining of dyes, so that such deposits may not be produced on the heater face, but there are some cases of making it difficult to use the recording head, because the recording quality is degraded, irrespective of almost no deposits on the heater face in a long term of recording using such ink, and there are no sufficient resolutions for that problem.

Particularly when the recovery can not be made only with a pump given as the compulsory recovery or with plural suction recoveries, there is currently no method or apparatus which allows an effective recovery processing in a short time, but the measure is only taken with a combination of complex processings.

SUMMARY OF THE INVENTION

A main object of the present invention is to provide a method and an apparatus for accomplishing an effective recovery processing only by changing the energy to be supplied to an acting area where the thermal energy is applied in an ink holding area, for problems requiring the compulsory recovery which is not an ordinary recovery as above mentioned.

Another object of the present invention is to provide an ink jet recording apparatus and a recovery method for use therewith which allows the proper operation of a compulsory recovery predischarge mode, which is unlike a predischarge mode to be performed usually during the recording at predetermined intervals.

Another object of the present invention is to provide a recovery method and an apparatus therefor which fulfills a reasonable and higher life span in a method of jetting the discharge ink to a recording sheet in the compulsory recovery predischarge mode.

Further, another object of the present invention is to provide a recovery sequence effective as the comprehensive recording sequence.

Specifically, the present invention is to provide an ink jet recording apparatus comprising recording means for recording by discharging the ink with bubbles formed by the thermal energy applied to a heat acting area in an ink holding portion, and energy supply means for forming the thermal energy on the recording means, characterized by including a compulsory recovery mode in which more than $10^3$ predischarges are accomplished by supplying the energy exceeding 1.48 times the minimum energy Eo necessary for producing the bubbles. According to this invention, it is possible to provide an early and secure measure for recording failures which was conventionally not resolved regardless of many expenditures in time and construction. In terms of a recording apparatus, this invention is an ink jet recording apparatus characterized by comprising means for supplying more than $10^3$ shots of the energy exceeding 1.48 times the minimum energy Eo necessary for discharging the ink with bubbles formed by the thermal energy applied to the heat acting area in the ink holding portion.

Also, an invention which further involves the constitution of the present invention is characterized by comprising means for supplying the energy preheating the heat acting area in the ink holding portion, and means for supplying more than $5 \times 10^5$ shots of the energy exceeding 1.44 times the minimum energy Eo necessary for discharging the ink with bubbles formed by the thermal energy applied to the heat acting area in the ink holding portion. This invention has an advantage of decreasing the energy necessary for the compulsory recovery with the predischarge.

In the following, there is described an invention including at least two general conditions for the recovery method and the apparatus of the present invention, in which the present invention includes all of them.

An invention of the apparatus according to the present invention comprises a recording sheet conveying mechanism, a recording head which has an ink holding portion and forms bubbles on a heat acting area, a recording head cap having an absorbing member inside thereof, a compulsory recovery mode during the recording in which the predischarge is accomplished into the recording head cap by supplying more than $10^3$ shots of the energy exceeding 1.48 times the minimum energy Eo necessary for discharging the ink with the bubbles formed by the thermal energy supplied to act on the heat acting area in the ink holding portion, and a compulsory recovery mode during the non-recording in which the predischarge is performed onto a recording sheet supplied from the recording sheet conveying mechanism by supplying more than $10^4$ shots of the energy exceeding 1.48 times the minimum energy Eo necessary for discharging the ink with the bubbles formed by the thermal energy supplied to act on the heat acting area in the ink holding portion. This invention can accomplish an effective recovery with the compulsory recovery while preventing image changes during the recording as it can make the recovery condition during the recording quite excellent.

Another invention of the apparatus according to the present invention comprises a recording sheet conveying mechanism, a recording head which has an ink holding portion and forms bubbles on a heat acting area, a compulsory recovery mode during the non-recording in which the predischarge is performed onto a recording sheet supplied from the recording sheet conveying mechanism by supplying more than $10^4$ shots of the energy exceeding 1.48 times the minimum energy Eo necessary for discharging the ink with the bubbles formed by the thermal energy supplied to act on the heat acting area in the ink holding portion, and a compulsory recovery mode for maintenance in which the predischarge is performed onto the recording sheet supplied from the recording sheet conveying mechanism by supplying more than $10^5$ shots of the energy exceeding 1.48 times the minimum energy Eo necessary for discharging the ink with the bubbles formed by the thermal energy supplied to act on the heat acting area in the ink holding portion, or supplying a larger amount of energy than in the compulsory recovery mode during the non-recording. This invention has such advantages that a stable recording time can be secured by allowing the user himself to easily perform a maintenance which the user of the recording apparatus can sufficiently cope with, and in addition, the dead time of apparatus can be largely shortened by dealing promptly with the maintenance processing which is normally performed with a service call.

The above constitution for the compulsory recovery mode in which the predischarge is performed onto the recording medium supplied has advantages that the need of processing the predischarged ink can be eliminated and the effect of the compulsory recovery can be visually seen.

Also, in a constitution where the recording means has a plurality of heat acting areas and the predischarge is intermittently performed onto the recording sheet, it is possible to accomplish a longer life of heat generating element while suppressing the deformation of recording sheet caused by the ink.

The recording means or recording method according to the present invention includes a method of forming bubbles with the optical energy as previously described, but preferably electricity-heat converter is used.

Note that the magnification relative to the reference energy is 1.48 or more, and practically 2.2 or less. As the increase of the energy should be suppressed as least as possible, it is preferably 2.0 or less, but when the effective predischarge in a short time is performed with the variable width of pulse, it is preferably 1.85 or less.

The facts which the present invention has resolved will be described. As a result of minutely examining the recording head with the recording quality degraded, it has been found that the amount of bubbles is reduced as compared with a proper amount of production, irrespective of almost no variation in the resistance of a heater provided to form the bubbles by supplying the thermal energy to the ink. Accordingly, as the velocity of ink droplets is decreased with insufficient discharge energy caused by the reduced amount of bubbles, and the bubbles may be irregularly formed, it has been found that the quality of recording is degraded.

The present invention was achieved based on technical aspects as above described found by the present invention, and it is important on the ink jet recording apparatus and the recovery method of the present invention to supply the driving energy so that the amount of electrical energy for driving the discharge energy generating elements during the recovery operation may be more than or equal to 1.48 times the minimum amount of electrical energy necessary for driving the discharge energy generating elements during the recording.

According to the present invention, with the recovery operation to be performed at a discharge failure of the recording head, it is possible to accomplish the recovery securely by discharging the ink through the discharge port in a condition where the amount of electrical energy to be supplied to the discharge energy generating elements such as electricity-heat converters for generating the thermal energy useful as the discharge energy is more than or equal to 1.48 times (or 1.44 times if the preheating exists) the minimum amount of electrical energy necessary for the recording. The discharged ink can be absorbed into recording medium as the solid print (discharge for print through all discharge ports), but preferably, it can be automatically exhausted into a cap member or ink withdrawal means provided, together with the conventional recovery operation such as wiping or ink suction operation from the recording head, whereby it is possible to accomplish the recovery so that the ink can be discharged through all the discharge ports in the excellent condition.

BRIEF DESCRIPTION OF THE DRAWINGS

FIG. 11 is an explanation view showing a specific example of another print pattern.

DETAILED DESCRIPTION OF THE PREFERRED EMBODIMENTS

Figure 1:
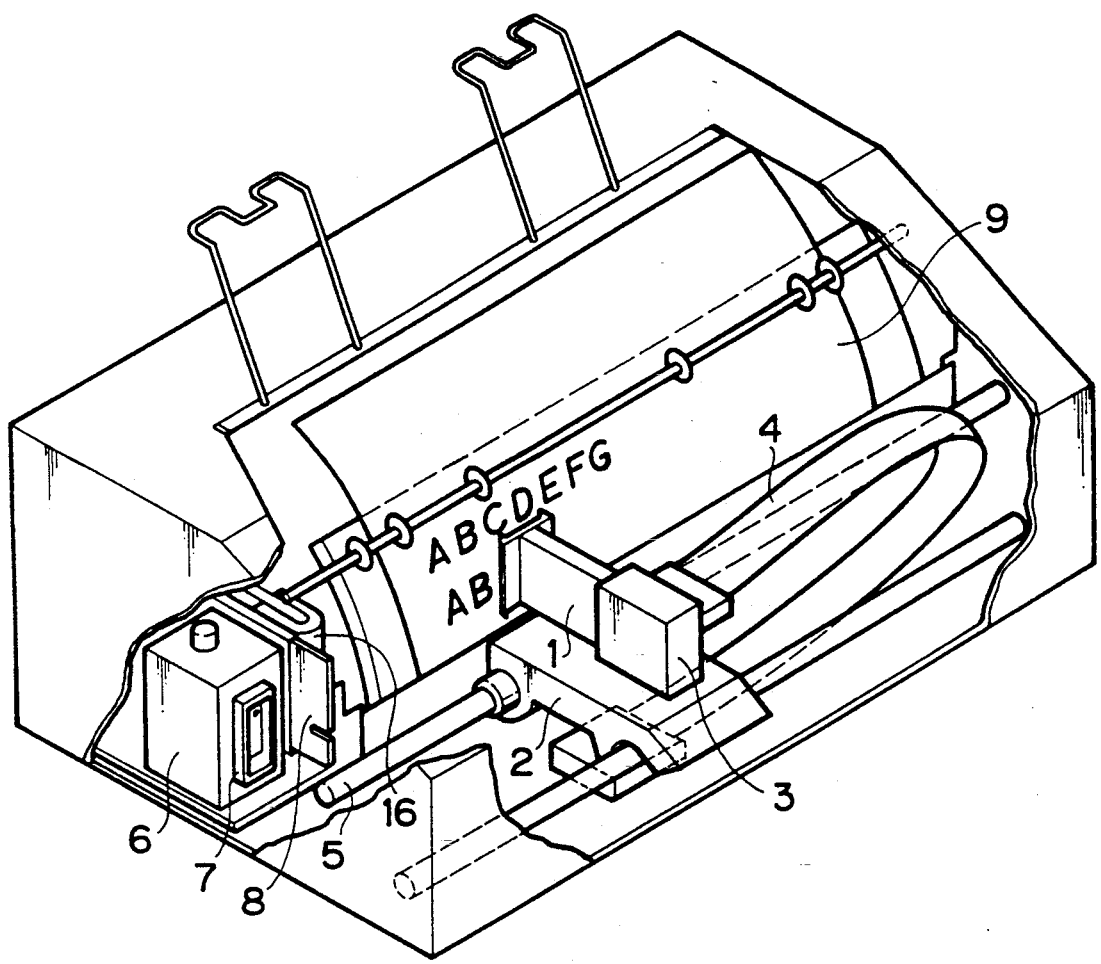
FIG. 1 is a perspective view showing one example of an ink jet recording apparatus to which the present invention is applicable.

FIG. 1 shows one example of an ink jet recording apparatus to which the present invention is applicable. Here, 1 is an ink jet recording head, 2 is a carriage on which the recording head 1 is mounted, 3 is a connector for supplying an electrical signal for recording to the recording head 1, 4 is a flexible cable for transmitting the electrical signal from a main device to the recording head 1, 5 is a guide shaft for holding the carriage 2 freely movably, 6 is a cap unit having recovery means, 7 is a cap member, 8 is a wiper blade made of a material such as rubber, and 9 is a recording sheet of recording medium held at a position opposed to the recording head 1. Also, 16 is a soft porous member such as urethane foam for removing contaminants or fixed inks on a surface of the head.

Note that FIG. 1 shows a state during the recording operation, in which the recording head 1 is normally positioned opposed to the cap unit 6 in a condition where the power source is off, while if the power is turned on, the head 1 undergoes the automatic recovery operation with the cap unit 6 in a condition in contact with the cap member 7. Specifically, the ink is sucked from the head 1 with a suction pump, not shown, as will be described later, while waiting for a recording signal, and if the recording signal is received, the cap 7 is released from the head 1 and the recording is started.

Figure 2:
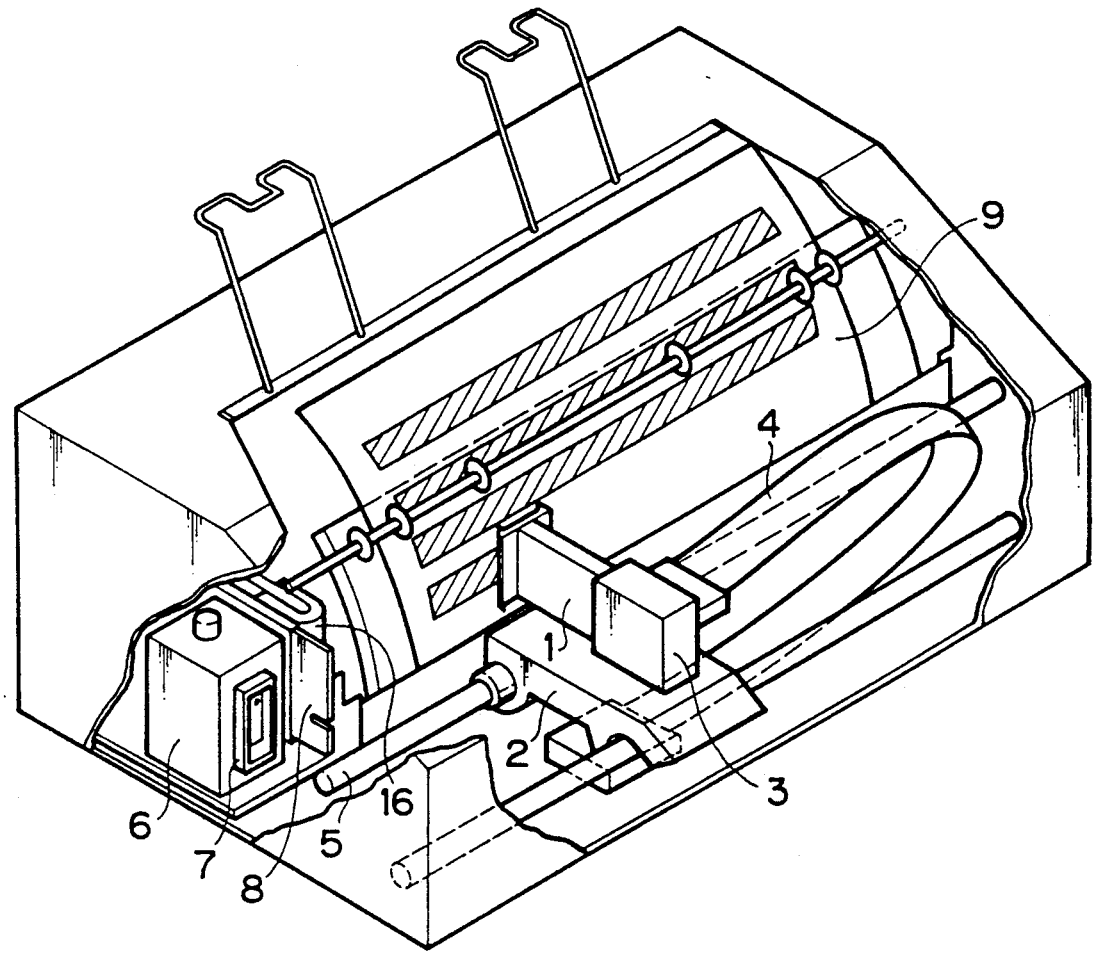
FIG. 2 is a perspective view showing one example of a recovery operation according to the present invention.

Note that the recovery discharge according to the present invention thereinafter referred to as the compulsory recovery discharge to distinguish from the ordinary recovery operation automatically performed when the power is turned on) is performed with a larger energy than the ordinary one, for simultaneously discharging the ink through all discharge ports, in which FIG. 2 shows a state where the compulsory recovery discharge is performed in a first example. Also, the ink compulsory discharge operation for recovery is performed by rising the voltage applied to the head 1 while the pulse width is kept constant, or by using a greater output than for the recording, with an increased pulse width, while the voltage supplied to the head 1 is kept constant. Note that usually after the recording sheet 9 is set on the apparatus, the compulsory recovery discharge is started onto a face of the sheet in a predetermined operation, and after the discharge of a predetermined number of pulses is terminated, it is automatically stopped.

However, in this example, trouble for setting the recording sheet 9 is taken, and further, when the paper width of the sheet 9 is small, a failure may arise that the discharge is made over the paper width, thereby making the inside of the apparatus dirty, so that the compulsory recovery discharge is performed into the cap member 7 as another means. Thereby, it is possible to prevent a disadvantage of making the inside of the apparatus dirty due to maloperation, and shorten the wasteful time such as a sheet feed time.

An example will be described below in which the compulsory recovery operation is performed by discharging the ink into the cap member 7.

Figure 3:
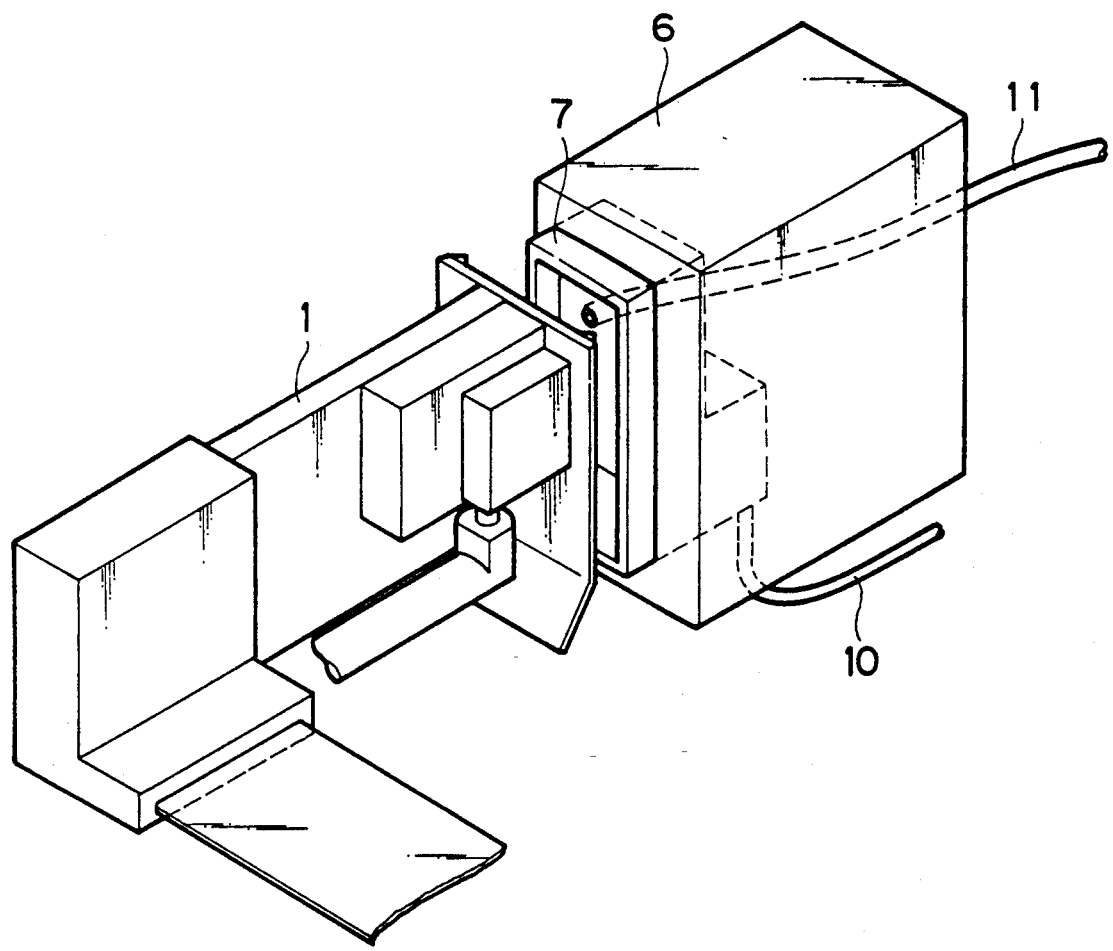
FIG. 3 is a perspective view showing a state of another recovery operation according to the present invention.

The compulsory recovery discharge in this example is performed at a home position, i.e., a position where the head 1 is opposed to the cap member 7, in a predetermined operation. FIG. 3 shows a view in performing the compulsory recovery discharge.

Figure 4A:
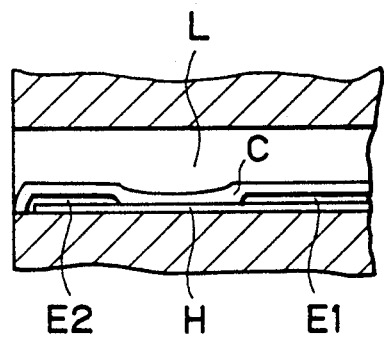
FIG. 4A is a partial detail view of a head thereof.
Figure 4B:
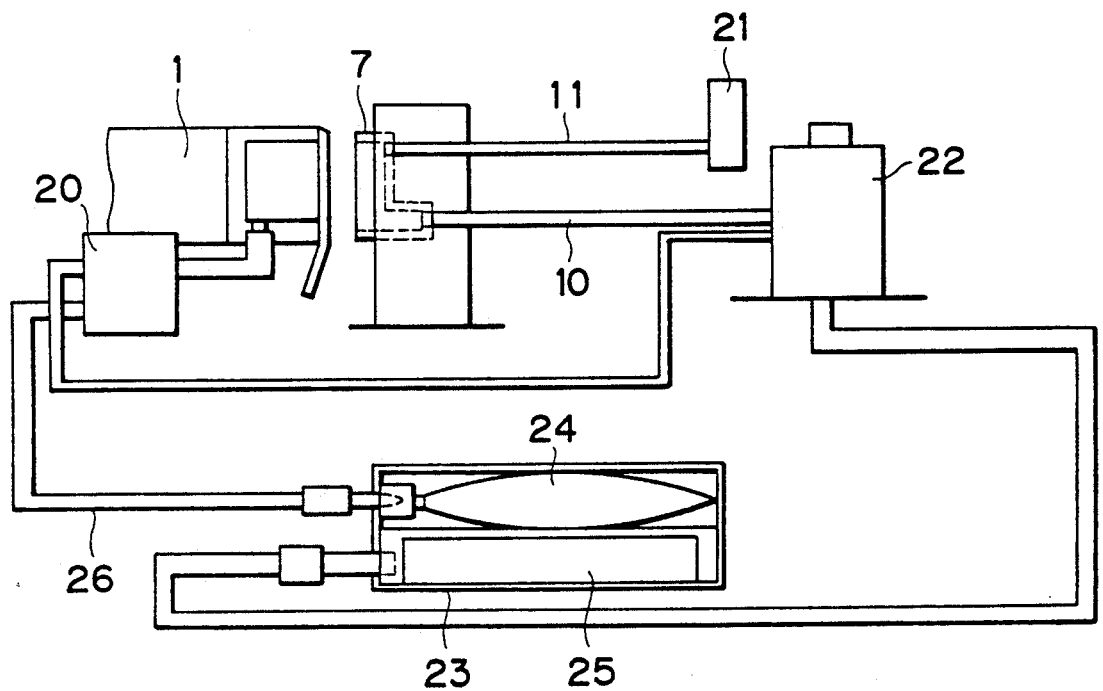
FIG. 4B is a systematic view showing an ink supply system and a recovery system for the recovery according to the present invention.

If an instruction of the compulsory recovery operation is given, firstly, the setting is made so as to provide a constant pulse width by rising the voltage supplied to the recording head 1, or an increased pulse width by keeping the head voltage constant, whereby a larger output than for the recording is used. Note that the discharge is performed with the head 1 opened from the cap member 7, the ink exhausted from the cap member 7 is sucked through a suction tube 10 as shown in FIG. 4. In FIG. 4, 20 is a sub ink tank for supplying the ink to the head 1, 21 is an atmosphere opening valve for opening or shutting the interior of the cap member 7 to or from the atmosphere, 22 is a pump for performing the recovery operation, 23 is an ink cartridge, 24 and 25 are an ink bag and a waste ink absorbing member stored in the ink cartridge 23, respectively, and 26 is an ink supply tube, in which the ink is supplied from the ink bag 24 via the tube 26 to the subtank 20, then led to the recording head 1 and discharged.

Also, when the ordinary recovery operation is practiced, the ink is sucked from the head 1 with a negative pressure produced by the pump 22, with the atmosphere opening valve 21 being closed, in which the ink sucked from the head 1 via the cap member 7 is exhausted through the pump 22 into the waste ink absorbing member 25 within the ink cartridge 23.

Next, a specific example of the compulsory recovery discharge will be described in detail. With a liquid channel 2 of the known head 1 is provided a heat generating portion formed between a pair of electrodes E1, E2 provided on a heat generation resistive layer H. This heat generating portion supplies the thermal energy to a heat acting area (in the ink) nearby. Note that this heat generating element is provided with a well-known protective layer C.

In the normal recording with the head 1, the drive for discharging the ink is performed by supplying a driving pulse having a pulse width of 3 μs, a head voltage of 28 V and a freuqency of 5.5 KHz, across the electrodes E1, E2. Also, for the head temperature control during the recording, the heat is retained by external heating means mounted on the head 1 or internal heating means within the head 1 not used for the discharge, both not shown, so that it may be at 30° C. in starting. However, if the recording is practiced for a long time (e.g., about 30 to 50 million characters) in this state, burnings of dyes in the ink or deposits of impurities are accumulated on the heat generating element (heater) H, not shown, provided in the liquid channel L, thereby gradually making the forming of bubbles unstable and not providing the normal amount of bubbles, so that fine ink droplets for recording are smaller or the discharge speed of ink droplets is decreased, which may degrade the recording quality.

Conventionally, when the recording quality was degraded or the undischarge occurred, the recovery operation was performed, such that the ink was sucked from the head with the cleaning operation, or the discharge face was wiped with a soft porous member, e.g., urethane foam, but there were some cases where the forming of bubbles might be unstable, which could not be recovered with such cleaning operation. Thus, to meet the condition as previously mentioned, the present invention permits the recovery to the state of substantial initial performance by 1) increasing the driving pulse width, or
2) increasing the driving voltage.

with the compulsory discharge in which a larger energy than the energy given at the recording is supplied to the heat generating portion.

Figure 5:
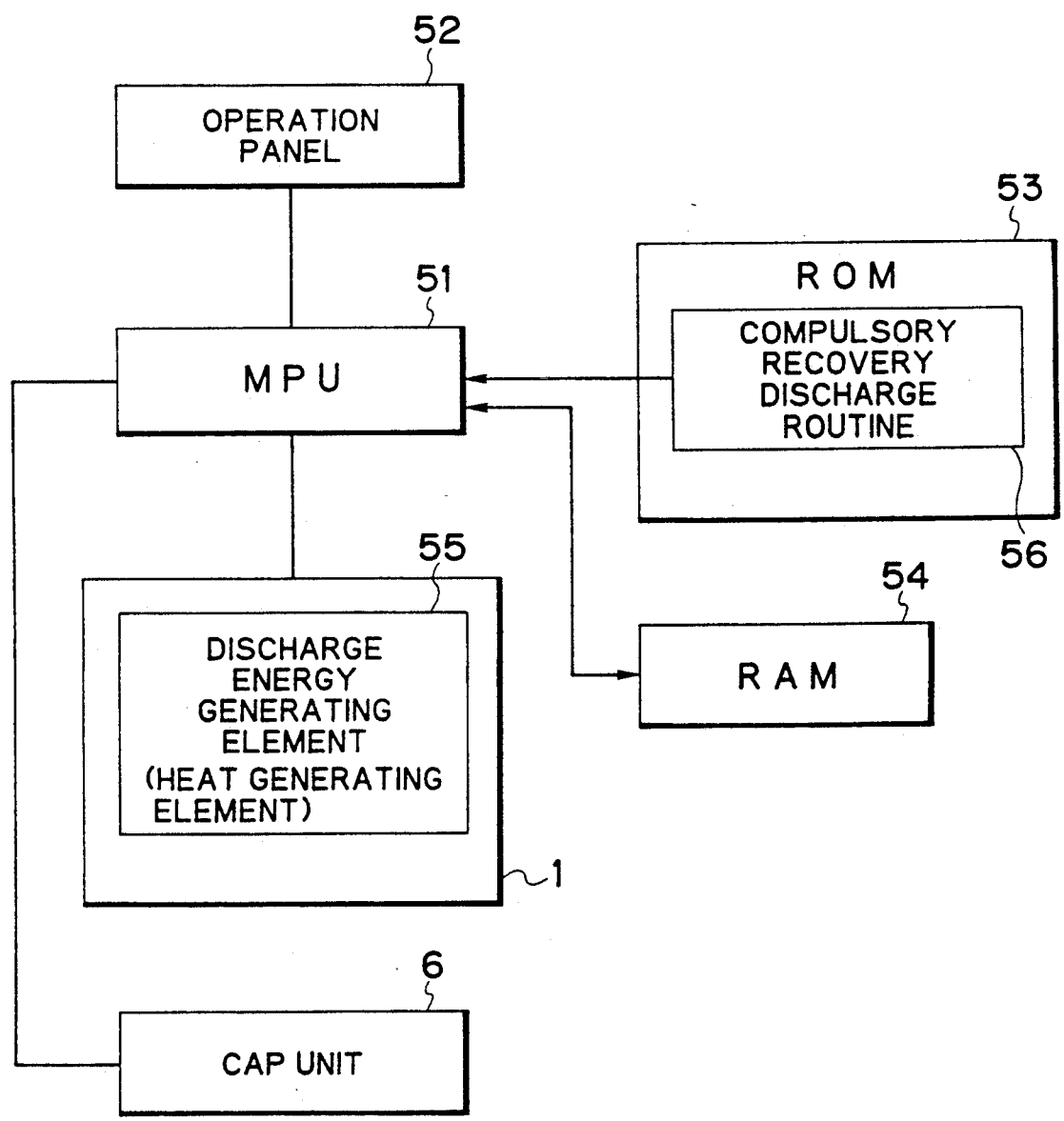
FIG. 5 is a configuration diagram of a circuit for performing the compulsory recovery operation according to the present invention.

FIG. 5 shows an example of a circuit configuration for performing the compulsory recovery discharge according to the present invention. Here, only the constituents necessary for the recovery operation are shown, in which MPU51 has a clock or timer for controlling various operations for the recording. 52 is an operation panel comprising the keys for specifying a compulsory recovery mode or other modes, in addition to a recording start key, not shown. 53 is a ROM, and 54 is a RAM for storing record data, etc. in which ROM 53 stores a recovery discharge routine in the compulsory recovery mode, or a routine 56 for performing the recovery operation by instructing the MPU51 that the pulse width, the driving voltage and the number of driving pulses should be applied to the discharge energy generating element 55.

Experiments were performed to obtain the above recovery condition, and it was found that 1) as a condition of increasing the driving voltage for the compulsory recovery discharge, providing that the bubble start voltage (minimum discharge voltage) is Vo, it is desirable that the ratio of Vo to the driving voltage, Kv value (V/Vo), is 1.22 to 1.35 (more correctly, the amount of energy can be represented by $KV^2$, which is 1.48 to 1.82), and the number of pulses is set in a range from $3 \times 10^5$ to $10^6$ (the bubble start voltage is a voltage value Vo for a pulse width of 3 μs).

2) as a preferable condition of varying the pulse width for the compulsory recovery discharge, providing that the bubble start pulse width (minimum discharge pulse width) is $P_{TO}$, the recovery effect can be obtained when the ratio of the driving pulse width $P_T$ to $P_{TO}$, $K_T$ value ($P_T/P_{TO}$), is 1.48 to 1.7; more preferably, with various examinations of changing the lower limit, the level-up can be accomplished as a whole with 1.5 or more magnification, and more preferably, the recovery operation can be more effectively performed with 1.55 or more (note that the bubble start pulse width (minimum discharge pulse width) in 2) is the pulse width $P_{TO}$ for a voltage value of 28 V). Note that the amount of energy has a relation of $Kv^2 = K_T$.

Specific examples are shown below as to the conditions. For an ink jet recording apparatus which was set to record with Head voltage: 28 V
Discharge driving, pulse width: 3 μs
Discharge frequency: 5.5 KHz a method of increasing the voltage for the compulsory recovery discharge was performed with Head voltage: 30.2 V (bubble start voltage Vo × 1.22)
Discharge driving pulse width: 3 μs
Driving frequency: 4.0 (−5.5 KHz)
Discharge amount: $1 \times 10^6$ pulses with all nozzles It should be noted that the discharge frequency is desirably set at a lower value to prevent nondischarge from occurring due to excessive bubbles.

As a method of increasing the pulse width for the compulsory recovery discharge, an experiment was perfomred with Head voltage: 28 V
Discharge driving pulse width: 3.48 μs (bubble start pulse width × 1.48)
Discharge frequency: 4.0 (−5.5) KHz
Discharge amount: $1 \times 10^6$ pulses with all nozzles As a result, the recording quality after the compulsory recovery discharge could be significantly improved as compared with before it. This compulsory recovery discharge method is especially preferable to a recovery method for print deviation when the print is practiced for a long term (with 30 to 40 million characters), but the effects can be sufficiently appreciated even when the recording quality is degraded due to a long storage time.

The results of above experiments are shown in the following table.

TABLE 1

| | Recoverability with increased voltage (number of experiments n = 10) | | | |
|---|---|---|---|---|
| Number of discharge pulses Kv | Number of recovery discharge pulses | | | Remarks |
| | $3 \times 10^5$ | $5 \times 10^5$ | $10^6$ | |
| 1.15 | X | X | X | Normal discharge condition (pulse width 3 μs fixed) |
| 1.20 | X | X | X | Normal discharge condition (pulse width 3 μs fixed) |
| 1.22 | △ | ○ | ○ | Normal discharge condition (pulse width 3 μs fixed) |
| 1.30 | ○ | ○ | — | Normal discharge condition (pulse width 3 μs fixed) |
| 1.35 | ○ | — | — | Normal discharge condition (pulse width |

TABLE 1-continued

Recoverability with increased voltage (number of experiments n = 10)

| Number of discharge pulses Kv | Number of recovery discharge pulses | | | Remarks |
|---|---|---|---|---|
| | $3 \times 10^5$ | $5 \times 10^5$ | $10^6$ | |
| | | | | 3 μs fixed) |

Other comment: The head temperature is retained at 30° C. in starting.
Evaluation
○: print quality recovered
Δ: print quality slightly recovered
X: print quality not recovered (bad)

TABLE 2

Recoverability with increased voltage (n = 20)

| Number of discharge pulses $K_T$ | Number of recovery discharge pulses | | | Remarks |
|---|---|---|---|---|
| | $3 \times 10^5$ | $5 \times 10^5$ | $10^6$ | |
| 1.33 | X | X | X | Normal discharge condition (voltage 28 V fixed) |
| 1.44 | X | X | X | Normal discharge condition (voltage 28 V fixed) |
| 1.48 | Δ | ○ | ○ | Normal discharge condition (voltage 28 V fixed) |
| 1.70 | ○ | ○ | ○ | Normal discharge condition (voltage 28 V fixed) |
| 1.82 | ○ | — | — | Normal discharge condition (voltage 28 V fixed) |

Other comment: The head temperature is retained at 30° C. in starting.
Evaluation
○: print quality recovered
Δ: print quality slightly recovered
X: print quality not recovered (bad)

TABLE 3

Recoverability with head temperature increased (n = 10)

| Number of discharge pulses Kv | Number of recovery discharge pulses | | | Remarks |
|---|---|---|---|---|
| | $3 \times 10^5$ | $5 \times 10^5$ | $10^6$ | |
| 1.15 | X | X | X | (pulse width 3 μs fixed) |
| 1.20 | X | Δ | ○ | (pulse width 3 μs fixed) |
| 1.22 | ○ | ○ | — | (pulse width 3 μs fixed) |
| 1.25 | ○ | — | — | (pulse width 3 μs fixed) |
| 1.30 | ○ | — | — | (pulse width 3 μs fixed) |

Other comment: The head temperature is retained at 55° C. (The head is retained by using internal heating means within head or external heating means dedicated to the heating which is not used for the discharge).
Evaluation
○: print quality recovered
Δ: print quality slightly recovered
X: print quality not recovered Note that as a result of increasing the pulse width while heating the head 1 under the same condition, the effect could be seen when $K_T$ lay in a range from 1.49 to 1.7.

As will be clear from Tables 1 to 3, the effect could be seen when Kv value for the voltage was in a range from 1.22 to 1.35 in the case of Table 1. It was found that the input energy into the heater with a Kv value of 1.22 was about 1.5 times the minimum discharge energy, and the recovery was made with a discharge pulse number of $5 \times 10^5$, while the energy with a Kv value of 1.30 was about 1.7 times, and the recovery was made with a discharge pulse number of $3 \times 10^5$. There was the effect when the Kv value was near 1.216, while there was no effect near 1.215. This substantiated the fact that the value of 1.48 times the energy value was critical.

Similarly, when the pulse width in Table 2 was increased, the print quality could be recovered with a $K_T$ value of 1.48 or more. This substantiated the condition of the present invention more correctly.

Table 3 shows the results with the head temperature forcibly retained at a high temperature, in which it is found that the input energy can be slightly lowered (Kv=1.20), and the effect can be improved with a reduced number of discharge pulses.

Moreover, the specific operation in the compulsory recovery discharge will be described based on FIG. 3. Here, 11 is an atmosphere communicating tube provided for releasing the pressure within the cap member 7 and connected to an atmosphere opening valve 21 as shown in FIG. 4. When a record start signal is entered to perform the compulsory recovery discharge in a state of FIG. 3, the cap member 7 is retracted to a position a little away (about 0.5 to 2 mm) from the head 1 and placed in a waiting state, holding an orientation to prevent the ink discharge by the compulsory recovery discharge from impinging on an inner face of the cap member and being splashed back.

Thus, the recording head 1 is driven in the above condition, in which the amount of discharge ink with the compulsory recovery is $64 \times 80\text{pl} \times 10^6$ pulses=5.1 cc because one drop volume is about 80 pl/drop in the head for use with this example (having 64 discharge ports). The automatic suction with the suction pump is performed about 11 times because the amount of suction a time with the pump 22 is 0.5 cc/time. (However, the suction is made every time 0.5 cc is reserved, providing that the ink receiving amount with the cap member 7 is more than 0.5 cc in this case.) After the compulsory recovery discharge is terminated, one or more normal recovery operations are made, whereby bubbles remaining within the head 1 or ink droplets adhering to an ink discharge face are removed.

As above described, it has been found that a degraded print quality can be recovered to the initial quality with the compulsory discharge. However, when minute degradations in the print quality are detected, there is a risk of shortening the life of head on its durability if the compulsory discharge recovery is attempted many times.

Therefore, a further experiment was made, and in examining the minimum number of pulses for the recovery of minute degradation while satisfying a condition of 1.48 times for the present invention, with a head which failed to form bubbles at the early time of recording which was discovered in a long storage (left away for 3 months), the recoverability was such that the print quality could be sufficiently recovered to its initial quality with $5.7 \times 10^4$ to $1.8 \times 10^5$ pulses. Also, if the recovery was once performed in the order of $n \times 10^3$ pulses, the recovery effect could be obtained to sufficiently meet the normal continuous recording. Where n is $1 \leq n < 10$, and preferably, n=5 or more.

The following method was taken as specific means.

When the user practices the recovery using a recording medium, one sheet (A4 size) is desirable, taking the trouble into consideration, and further, as a result of seeking the number of pulses undoubtedly effective on the durability, the following condition was appreciated as preferable.

Using one sheet of A4 size, print was made ½ thinned-out and staggered in 80 columns and 40 lines, with a head temperature of 65° C. retained and a discharge frequency of 5.5 KHz, so that the compulsory recovery discharge pulse number was $5.7 \times 10^4$. The compulsory discharge recovery operation was performed with the method as previously described in FIG. 2. Further, when the discharge for all solid print was made onto one sheet of A4 size, in 80 columns and 60 lines at maximum, $1.8 \times 10^5$ pulses are desirable.

Accordingly, the compulsory recovery discharge for the user to recover the print quality is desirable with a pulse number ranging from $5.7 \times 10^4$ to $1.8 \times 10^5$ pulses, and there is an advantage that the discharge can be more easily confirmed on the recording medium. Note that when the quality can not be recovered with the compulsory discharge recovery, the compulsory recovery discharge with $3 \times 10^5$ or more pulses must be performed. Normally, the pulse number is more preferably $1.8 \times 10^5$ to $3 \times 10^5$ from the viewpoint of the life, and the pulse number exceeding $3 \times 10^5$ should be limited to specific occasions such as the maintenance. Specific discharge dot patterns using the recording medium are shown in FIGS. 6 to 8.

Figure 6:
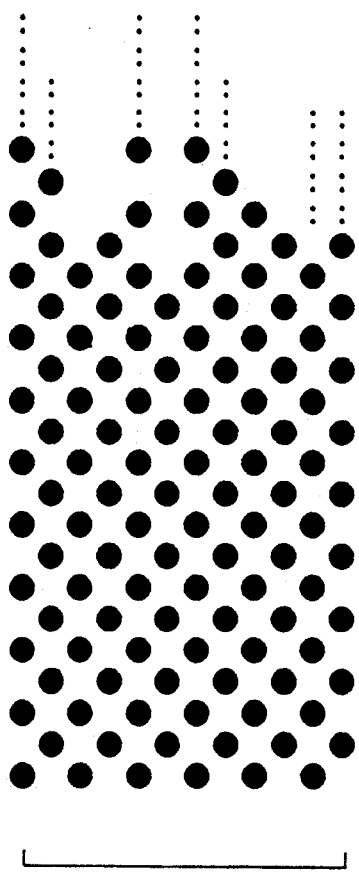
FIG. 6 is an explanation view showing an example of dot pattern in performing the compulsory recovery discharge onto a recording medium.

FIG. 6 shows a pattern which is printed alternately staggered with a recording head having 12 nozzles (discharge ports) thinned out by ½. This pattern has an advantage that the state of dot through each discharge port is easily determinable for the all solid print, and in addition, it is superior in the effect of removing bubbles from other than the heat generating portion. With this pattern, the deformation of recording sheet is prevented and the recovery can be accomplished without inconvenience even if the recording is made on the entire face of recording sheet.

Figure 7:
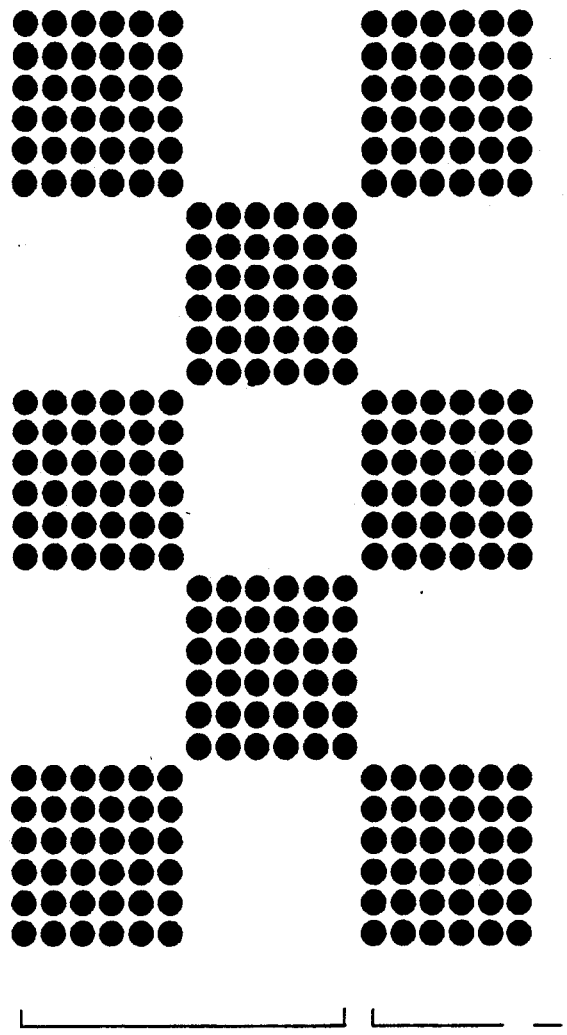
FIG. 7 is an explanation view showing another example of dot pattern in performing the compulsory recovery discharge onto a recording medium.

FIG. 7 shows a print pattern in which a recording head having 12 nozzles as in FIG. 6 is caused to continuously print 6 dots with upper and lower half of 6 nozzles each, and this $6 \times 6$ matrix is disposed staggered as a whole. With this pattern, the periods of abrupt discharge and pause are alternately encountered, so that the recovery effect can be further improved.

Figure 8:
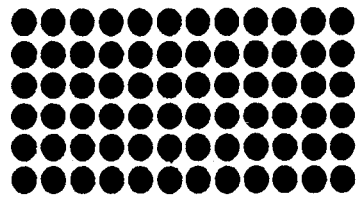
FIG. 8 is an explanation view showing another example of dot pattern in performing the compulsory recovery discharge onto a recording medium.
Figure 8:
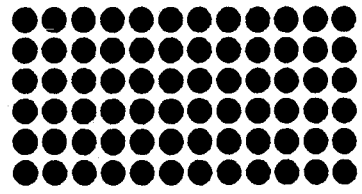
Figure 8:
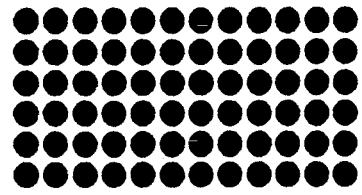

FIG. 8 shows a pattern in which the abrupt discharge and pause of FIG. 7 are alternately performed for all nozzles, and a remarkable effect can be provided because the state of ink can be improved due to multiplication effect of large ink flows within the head caused by the discharge through all nozzles.

In FIGS. 6 to 8, the compulsory recovery method of the present invention using the predischarge onto the recording sheet supplied is taken, wherein the post-processing of ink is eliminated, resulting in a smaller apparatus with reduced frequency of maintenance.

Further, an example in which the compulsory recovery discharge of the present invention is performed onto a paper face of recording medium will be described in detail.

Figure 9:
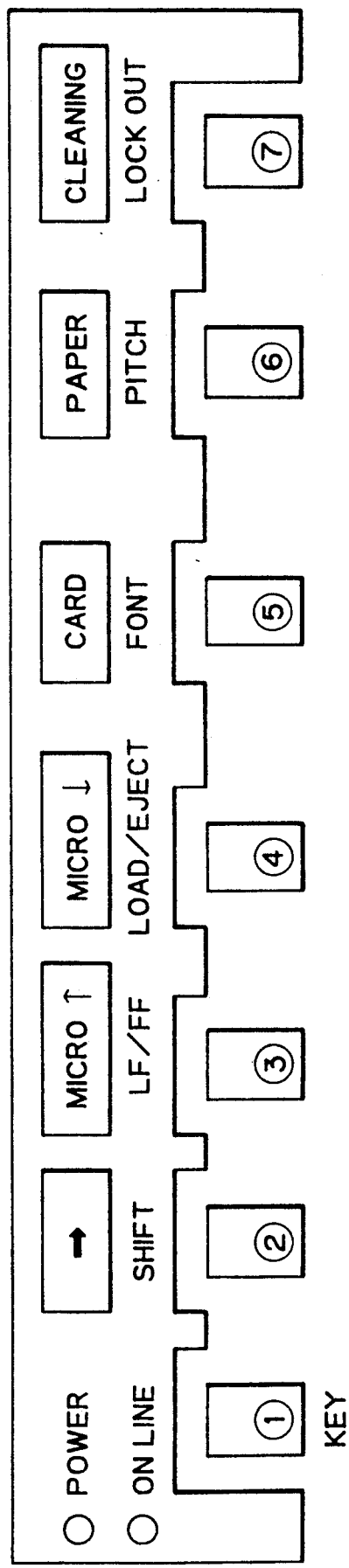
FIG. 9 is a schematic view showing an operation panel of a printer to which the present invention is applied.

FIG. 9 is a schematic view showing an operation panel of a printer used in the present invention. This printer has three modes for recovery means which are appropriately performed depending on the situation of failure, in which the first mode is a small recovery mode to be performed when the nondischarge of nozzles or deviation occurs, and can be executed with the following operations on the operation panel. If the panel mode is changed with the <SHIFT> key ②, and then the <CLEANING> key ⑦ is depressed, the cleaning for a head face is practiced with an urethane member 16 (as shown in FIG. 1) and then the suction recovery operation is performed once sequentially.

The second mode is a large recovery mode to be practiced when the recovery is difficult with the first mode, and can be executed with the following operations on the operation panel.

This mode can be performed by depressing the <SHIFT> key ② and the <CLEANING> key ⑦ concurrently or continuously, in which the suction recovery operation is performed four times continuously, and then the first mode is performed.

The third mode is a recovery mode with the compulsory recovery discharge of the present invention, which is to be practiced when the print quality is bad even though the undischarge or deviation failure has been recovered with the second mode, and can be executed with the following operations.

Figure 10:
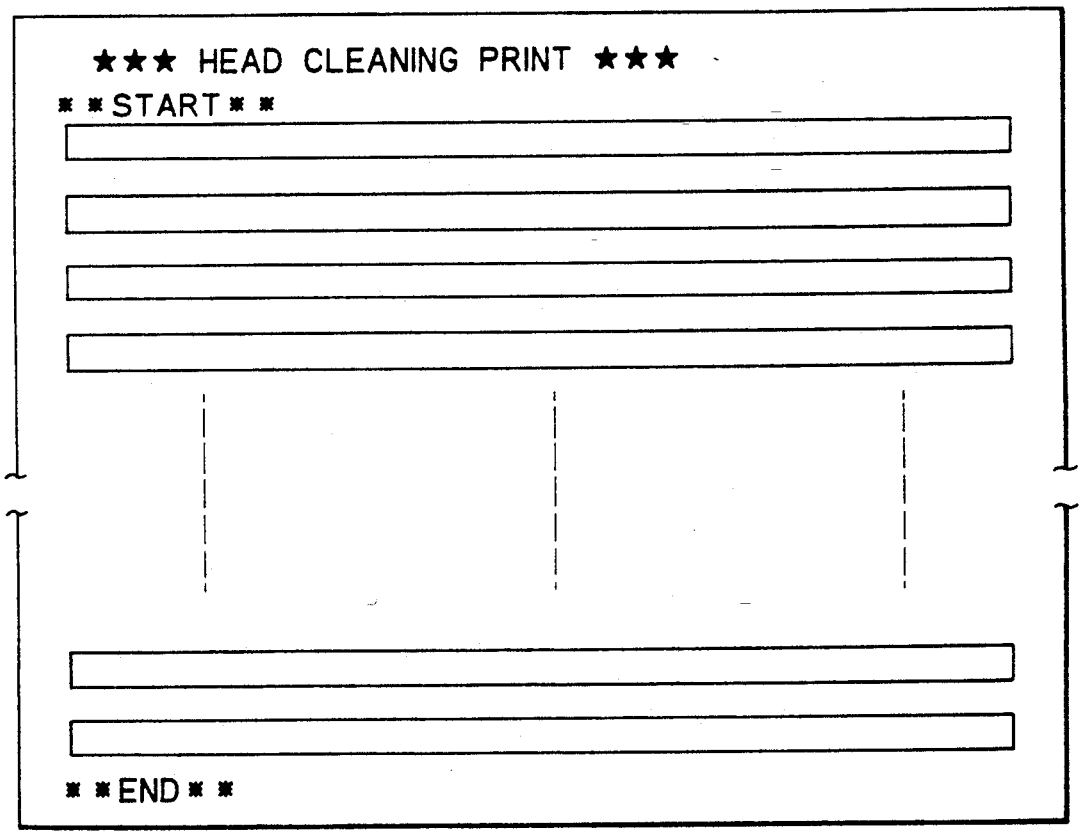
FIG. 10 is a view showing a specific example of a print pattern when the compulsory recovery discharge is applied.

This mode can be performed by depressing the <CLEANING> key ⑦ and the <PITCH/PAPER> key ⑥ concurrently after the panel mode is changed with the <SHIFT> key ②. That is, a paper is fed and the predischarge is performed to print a predetermined pattern with a predetermined number of pulses satisfying 1.48 multiplication condition as above described. With a constitution that when there is no paper of recording medium set, a paper sensor, not shown, is operated to automatically feed the paper, it will be understood that the paper is necessarily fed whenever the compulsory recovery discharge is executed, so that the ink contamination on the platen is avoided. When started, the compulsory recovery discharge is performed after the specific character notation is recorded, as shown in FIG. 10, whereby it can be seen that the compulsory recovery discharge is being executed. (The dot pattern used in the compulsory recovery discharge is one as shown in FIG. 6.)

After the compulsory recovery discharge is terminated, the paper is automatically exhausted, and then recovery means in the first mode is operated, thereby removing inks adhering to the neighborhood of nozzles or bubbles remaining within the head.

FIG. 11 is another example different from FIG. 10, in which the user can confirm the state of the compulsory recovery discharge, and know remaining lines. In FIG. 11, a reliable recovery can be also accomplished while informing the user that the compulsory recovery mode is being performed, as in FIG. 10.

In the example in which the predischarge was made into the cap as previously described, the recovery discharge was performed with the head and the cap separated by a fixed distance, but as another example, they do not have to be necessarily separated away, and it is also possible that the compulsory recovery discharge can be performed with the head 1 and the cap member 7 placed in contact with each other.

In this case, it is performed by having the atmosphere communicating tube 11 opened with the atmosphere opening valve 21, and sucking only discharged ink with the operation of the pump 22 as shown in FIG. 4. However, in this case, if an inner wall face of the cap is close to a discharge face, it is apprehended that discharged ink droplets are splashed back to adhere to the discharge face of the head 1, which may cause nondischarge if largely accumulated, whereby it is desirable to open the atmosphere opening valve 21 at fixed intervals and suck the ink from the head 1 to prevent the occurrence of nondischarge.

As a further another method, the ink is sucked through the discharge port of the head 1 by performing the suction operation automatically by means of the pump 22 with the atmosphere communicating tube 11 held in closed state, while at the same time the compulsory recovery discharge can be performed with the pulse width or voltage as previously described. This method has advantages that nondischarge can be eliminated through the discharge port of the head 1, and further the ink is prevented from splashing out of the cap member 7.

Figure 12:
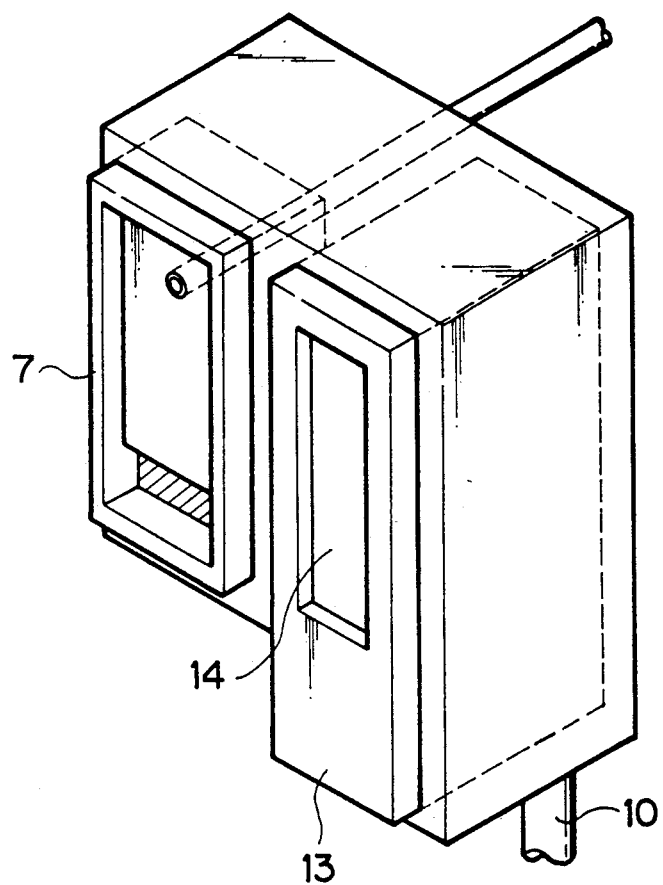
FIG. 12 is a perspective view of ink withdrawal means in another example of the present invention.
Figure 13:
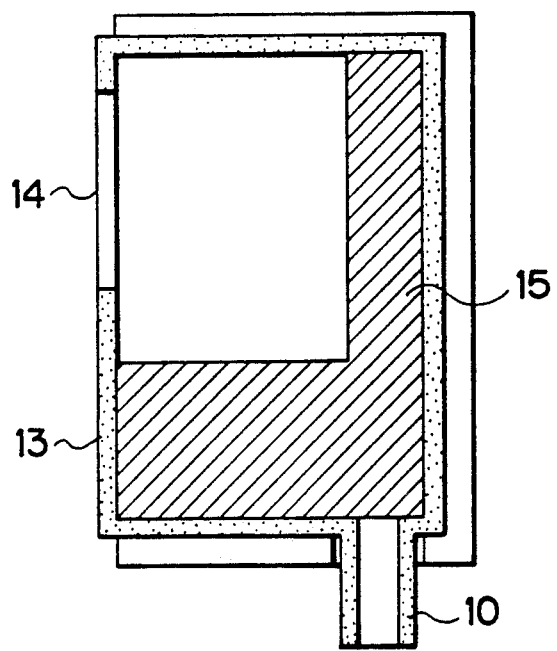
FIG. 13 is a cross-sectional view of FIG. 12.

While in the above example, waste ink reversed within the cap member 7 in the compulsory recovery discharge is automatically sucked, waste ink is not necessarily received into the cap member 7, but for example, it can be received into an ink withdrawal box provided apart from the cap member 7, as shown in FIGS. 12 and 13. That is, in this example, the ink discharged with the compulsory recovery is received through an opening portion 14 of the ink withdrawal box 13 to be absorbed into an ink absorbing member 15, and accumulated in a lower side to be exhausted into a suction tube 10. Note that in the ink jet recording apparatus of the continuous system, the ink discharged with the compulsory recovery can be withdrawn for reuse.

Figure 14:
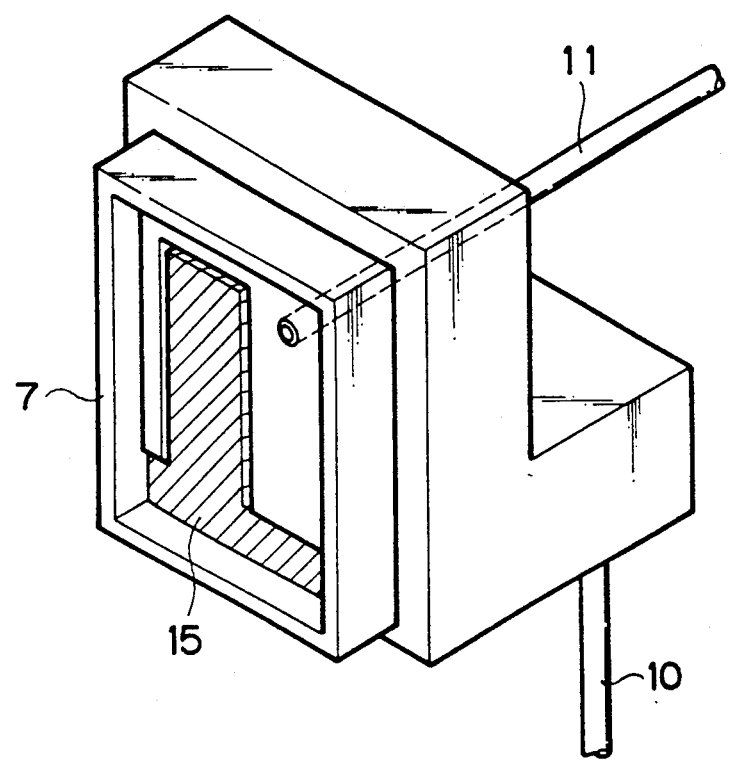
FIG. 14 is a perspective view of ink withdrawal means in further another example of the present invention.
Figure 15:
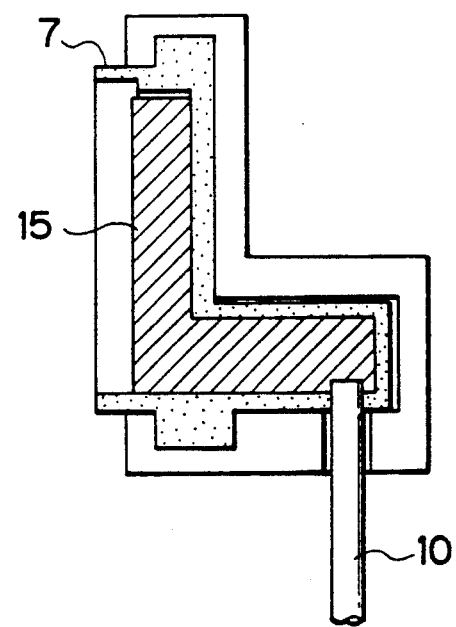
FIG. 15 is a cross-sectional view of FIG. 14.

FIGS. 14 and 15 show further another example of the present invention. In this example, to receive waste ink in the compulsory recovery discharge, the ink absorbing member 15 is provided within the cap member 7 and by discharging the ink toward the ink absorbing member 15, the splashing of ink can be avoided. Note that the ink absorbing member 15 is attached to keep a sufficient space at the position opposed to an array of discharge ports, in order to make it easier to receive the ink discharged with the compulsory recovery through the array of discharge ports and make it possible to prevent the ink from scattering outward. However, in this case, in performing the compulsory recovery discharge, the discharge face of the recording head 1 is kept in closed state by the cap member 7, or a slight amount of space may be provided therebetween.

Figure 16:
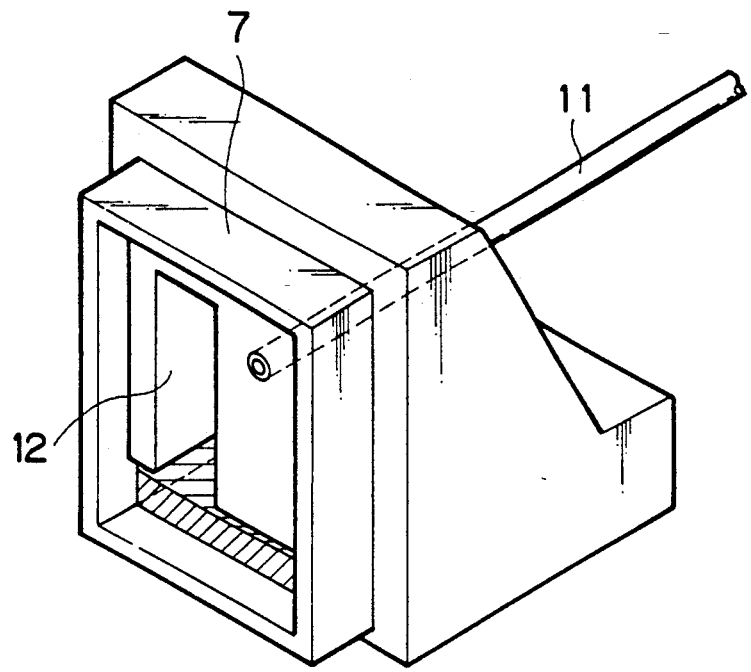
FIG. 16 is a perspective view of ink withdrawal means in a still further example of the present invention.
Figure 17:
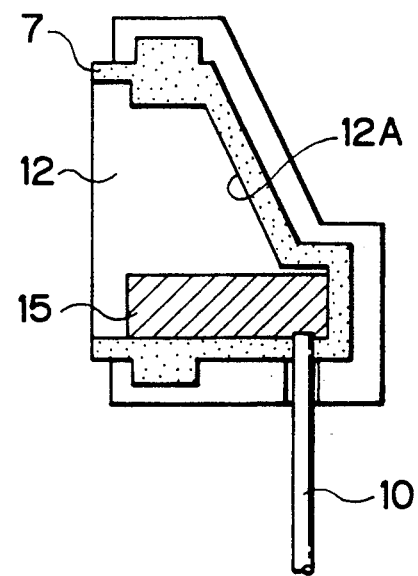
FIG. 17 is a cross-sectional view of FIG. 16.

FIGS. 16 and 17 show a form of the cap member 7 in still another example of the present invention.

In this example, an ink receiving groove 12 is provided in the cap member 7, a taper face 12A is formed inwardly of the ink receiving groove 12 as shown in FIG. 17, to receive discharged ink droplets on this taper face 12A and lead them downward. Thus, it is desirable to form at least the taper face 12A of a material which can easily receive ink droplets. In this way, this example can prevent the ink from splashing back on the cap member 7, so that no splashed ink may adhere to the recording head.

With the compulsory recovery into the cap, it is preferable to discharge the ink corresponding to an ink receiving volume of the cap itself if no other ink suction means acts on the cap. This is because the compulsory recovery can be securely accomplished exceeding the usual predischarge. In this example, for the cap having the absorbing member internally, preferred results could be obtained by supplying pulses in the order of $10^3$ to each discharge portion.

Next, an example of a preferred sequence according to the present invention will be described using Table 4.

TABLE 4

| | Rom name | Mode name | Pulse energy | Number of pulses | Discharge destination |
|---|---|---|---|---|---|
| Recovery means | Mode 1 | Normal recovery | $Eo \times 1.1$ | $10^2$ or less | Within cap (or absorbing member) |
| | Mode 2 | Compulsory recovery 1 | $Eo \times 1.48$ or more | $n1 \times 10^3$ | Within cap (or absorbing member) |
| | Mode 3 | Compulsory recovery 2 | $Eo \times 1.48$ or more | $n2 \times 10^3 - M_1 \times 10^5$ | Recording sheet |
| | Mode 4 | Maintenance only | $Eo \times 1.48$ or more | $M_2 \times 10^5$ | Recording sheet |

Note that $M_1$, $M_2$ are such that $1 \leq M_1 < M_2 < 10$, and n1, n2 are also such that $1 \leq n1 < n2 < 10$. Eo is the minimum energy for producing bubbles with which the ink can be discharged. In Table 4, recovery means of the present invention has a ROM for execution of each mode. Each ROM can be selected by a single key input signal as previously described or in combination thereof, but this example is met with either selection means, and has a feature in the mode switching itself. Each ROM will be described below.

ROM in mode 1 is selected in the normal recovery mode, the content of which is such that $10^2$ or less pulses with a pulse energy of $Eo \times 1.1$ are supplied to each heat generating element. In this mode, predischarged ink is received into the cap for head (or the ordinary absorbing member for withdrawal).

ROM in mode 2 is selected in the compulsory recovery mode 1 which is executed in a recording flowchart. Its content is such that $n1 \times 10^3$ pulses with an energy of $Eo \times 1.48$ or more are supplied to each heat generating element. This mode has the same discharge destination as in mode 1.

ROM in mode 3 is selected in the compulsory recovery mode 2 for the non-recording in which the predischarge is performed onto a recording sheet during the non-recording, i.e., with no recording based on the record signal. This ROM is to supply $n2 \times 10^3$ to $M_1 \times 10^5$ pulses (usually the order of $10^4$ is preferred) with an energy of $Eo \times 1.48$ or more to each heat generating element. Comparing mode 2 and mode 3, with a constitution capable of performing both modes, $n1 < n2$ is a preferably condition. This is a necessary condition for stabilizing the life because excessive recovery is unnecessary and the frequency of mode executions is increased during the normal recording.

ROM in mode 4 is useful for the predischarge onto the recording sheet for maintenance only, in which its condition is the severest. That is, the energy condition is $Eo \times 1.48$ or more and $M_2 \times 10^5$ pulses are supplied to each heat generating element. Here, $M_2 > M_1$ for M1 in mode 3. In mode 3 for use with the user, pulses in the order of $10^4$ are supported from the viewpoint of a higher life and a sufficient efficiency.

In this way, the present invention can be sufficiently accomplished as the ink jet recording apparatus itself has a given condition for each mode with a reference of Eo as above mentioned, irrespective of the form of the recording head.

Figure 18:
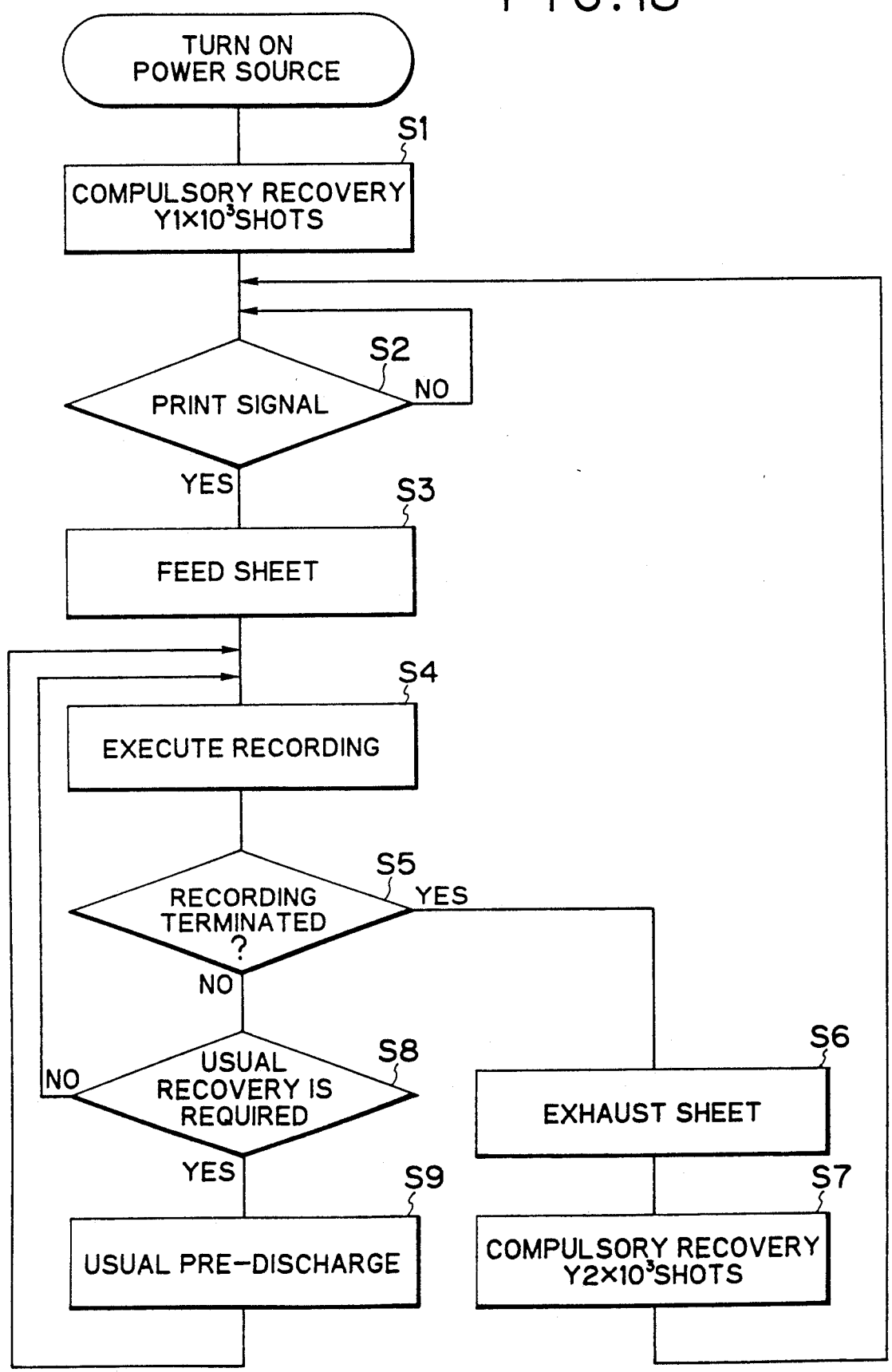
FIG. 18 is a flowchart for practicing the compulsory recovery mode during the recording in an example of the present invention.
Figure 19:
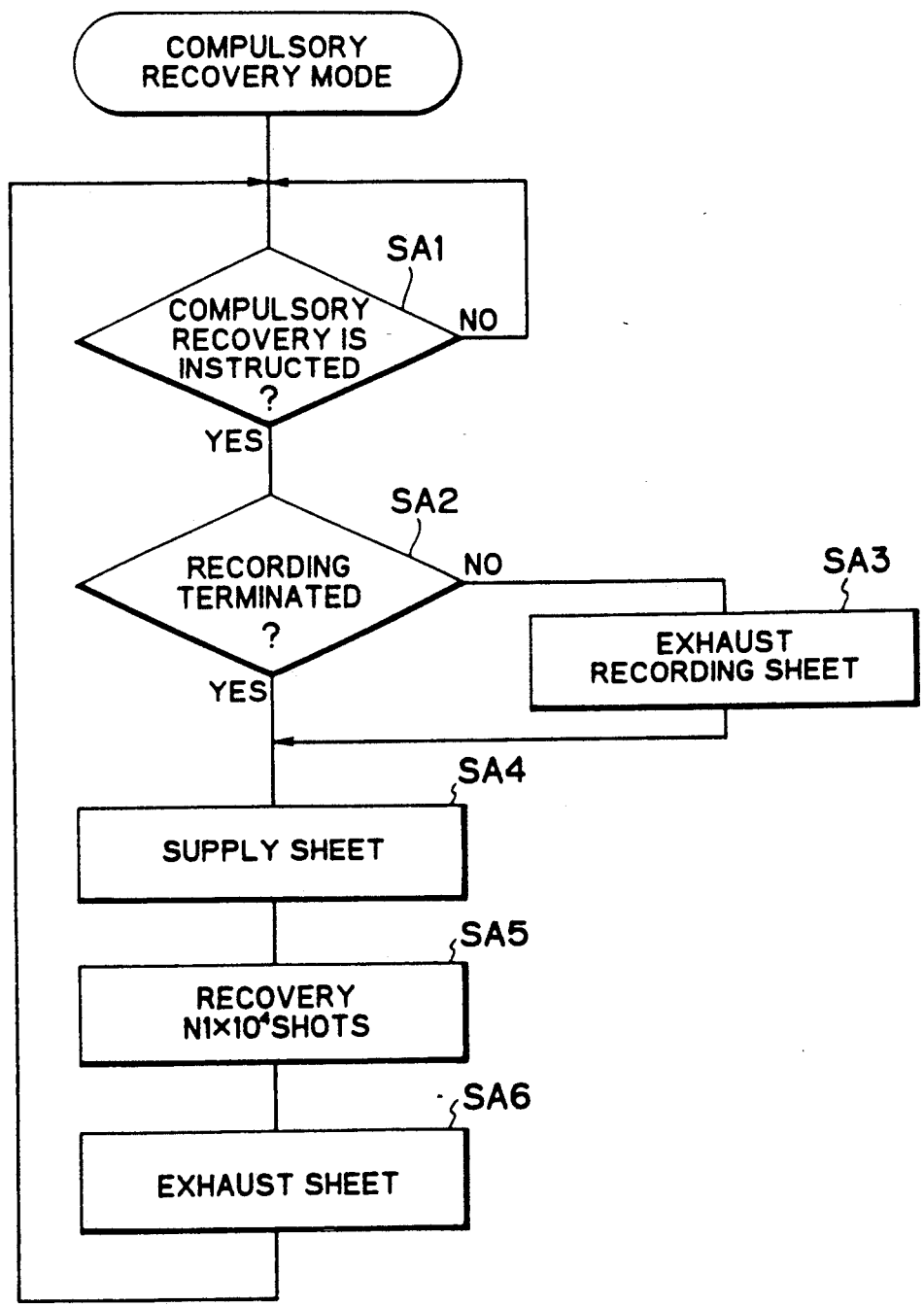
FIG. 19 is a subroutine for the compulsory recovery mode during the non-recording in the example of the present invention.
Figure 20:
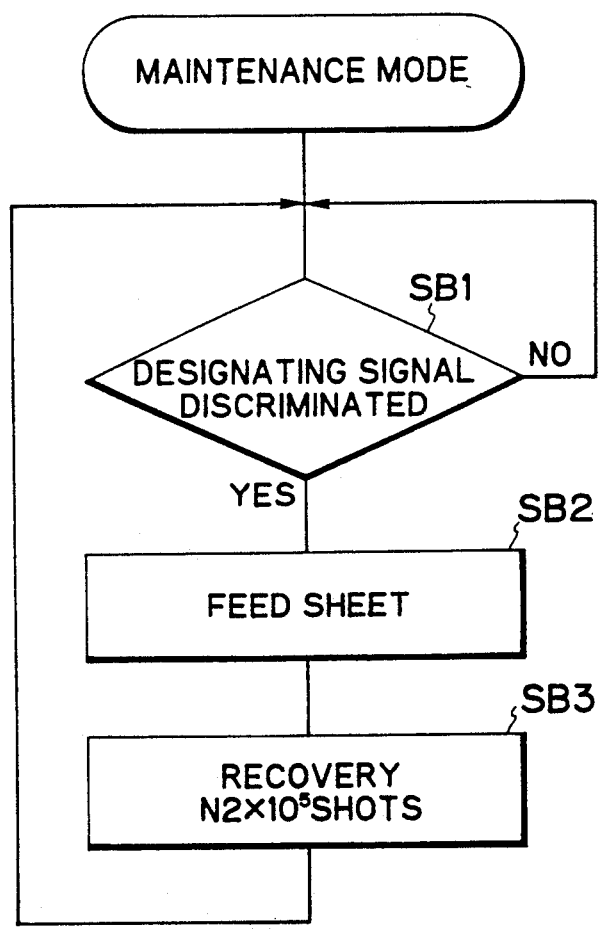
FIG. 20 is a subroutine for the compulsory recovery mode for maintenance in the example of the present invention.

FIGS. 18 to 20 show flowcharts of the example according to the present invention, and its subroutines, represented as the execution flow of contents described in Table 4. In this example, the control sequence is satisfied by prestoring those flows in memory even though there are not a plurality of ROMs.

FIG. 18 shows a main flow, FIG. 19 shows a compulsory recovery mode execution subroutine and, FIG. 20 shows a maintenance mode.

In FIG. 18, a printer is turned on, and at the same time, at step S1, the compulsory recovery mode is executed in such a way as to perform the predischarge into the cap or absorbing member by supplying $Y1 \times 10^3$ shots of pulses with an energy of more than Eo $\times$ 1.48 times to each heat generating element. Where $1 \leq Y1 < 10$.

Then, the routine proceeds to step S2 for deciding whether or not a print signal exists, in which if recording, a sheet is fed (step S3), and the recording is executed (step S4). At decision step S5, it is decided whether or not the recording is terminated, and at decision step S8, if the usual recovery is required during the recording, the usual predischarge is performed (step S9). After recording, at step S6, the sheet is exhausted, and then, at step S7, the compulsory recovery is performed ($Y2 \times 10^3$ shots of pulses with an energy of more than Eo $\times$ 1.48 times are given to each heat generating element). This compulsory recovery is sufficient with either one, and can decrease the required number of compulsory recoveries by a user instruction or for maintenance. Note that Y2 satisfies $1 \leq Y2 < 10$, and is also effective with $Y2 = Y1$, but if both of them are performed, Y2 is sufficient for $Y2 < Y1$.

The compulsory recovery in FIG. 19 is performed in the non-recording mode, in which it is continuously decided whether or not the compulsory recovery is instructed, at step SA1, and if instructed, it is decided whether or not the recording is terminated, at step SA2. Afterwards, if recording, the compulsory recovery can be executed after waiting for the termination of recording, or as in this example, the recording sheet is forcibly exhausted (step SA3) and a new recording sheet for the predischarge is supplied (step SA4).

If the supply of sheet is confirmed, the recovery with a predetermined pattern onto the sheet face is performed by supplying $N1 \times 10^4$ shots of pulses with an energy of more than Eo $\times$ 1.48 times to each heat generating element (step SA5). After termination of its pattern, the sheet is exhausted, at step SA6, and the routine waits, at step SA1. Where $1 \leq N1 < 10$.

On the other hand, the maintenance flow for service in FIG. 20 does not have to be always operated as the subroutine, but is sufficient if it is operable only in the abnormal state of the apparatus or maintenance state. In FIG. 20, because of the non-recording state, it is decided whether or not designating signal is discriminated, at step SB1, and then the sheet is fed (step SB2).

In this maintenance mode, pulses with an energy of Eo $\times$ 1.48 times are issued in the order of $10^5$. Accordingly, $1 \leq N2 < 10$.

As shown in FIGS. 18 to 20, an excellent recovery sequence can be obtained by programming the variable number of execution pulses for each compulsory recovery.

The present invention brings about excellent effects particularly in a recording head or a recording device of the system of discharging the ink with bubbles formed by the thermal energy proposed by CANON INC. among the various ink jet recording systems. With such a method, the higher density and definition of recording can be accomplished.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleate boiling corresponding to the recording information on electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) though an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. Nos. 4,558,333, or 4,459,600 disclosing the constitution having the heat acting portion arranged in the flexed region is also included in the present invention. In addition, the present invention can be also effectively made the constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure wave of heat energy correspondent to the discharging portion. That is, according to the present invention, the recording can be surely and effectively accomplished, irrespective of the form of the recording head.

Further, the present invention can be effectively applied to the recording head of the full line type having a length corresponding to the maximum width of a recording medium which can be recorded by the recording device. As such a recording head, either the constitution which satisfies its length by a combination of a plurality of recording heads or the constitution as one recording head integrally formed may be used.

In addition, among the above-mentioned serial types, the present invention is also effective in using a recording head fixed to the main device, a recording head of the freely exchangeable chip type which enables electrical connection to the main device or supply of ink from the main device by being mounted on the main device, or a recording head of the cartridge type integrally provided with an ink tank on the recording head itself.

Also, addition of a restoration means for the recording head, a preliminary auxiliary means, etc. provided as the constitution of the recording device of the present invention is preferable, because the effect of the present invention can be further stabilized. Specific examples of these may include, operation means at the power on, for the recording head, capping means, cleaning means, pressurization or suction means, electricity-heat converters or another type of heating elements, or preliminary heating means according to a combination of these, and it is also effective for performing stable recording to perform preliminary mode which performs discharging separate from recording.

As to the type or number of recording heads mounted, only one recording head is provided corresponding to a monochromatic ink, or a plurality of recording heads can be provided corresponding to a plurality of inks different in recording color or density. That is, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

In addition, though the ink is considered as the liquid in the described examples of the present invention, the present invention is applicable to the ink solidifying at or below room temperature, and liquefying or liquid at the room temperature, or the ink liquefying when a recording enable signal is issued, as it is common to control the viscosity of ink to be maintained within a certain range for stable discharge by adjusting the temperature of ink in a range from 30° C. to 70° C. in the ink jet system. In addition, in order to avoid the temperature elevation due to the heat energy by positive utilization of the energy for the change of state from solid to liquid, or to prevent the evaporation of ink by using the ink solid in the shelf state, the ink which has a property of liquefying only with the application of heat energy, such as the ink to be discharged as the liquid because the ink liquefies with the application of heat energy in accordance with a recording signal or already solidifies when reaching a recording medium, is also applicable to the present invention. In this case, the ink may be in the form of being held in recesses or through holes of porous sheet as liquid or solid matter, and opposed to electricity-heat converters, as described in Japanese Laid-Open Patent Application No. 54-56847 or Japanese Laid-Open Patent Application No. 60-71260. The most effective method for inks as above described in the present invention is one based on the film boiling as above indicated.

Further, a recording apparatus according to the present invention may be used in the form of an image output terminal in the information processing equipment such as computer, a copying machine in combination with a reader, or a facsimile terminal equipment having the transmission and reception feature.

As described above, according to the present invention, the recording quality can be improved by applying a predetermined number of pulses with the energy exceeding 1.48 times the minimum electrical energy to be supplied to the discharge energy generating element during the usual recording, to the discharge energy generating element of the recording head, when the recording quality is degraded due to discharge failure. Also, by automatically sucking the ink reserved within the cap member at the same time while discharging the ink into the cap member, with the compulsory recovery discharge, the recovery operation can be practiced simply without making the surroundings of the apparatus dirty.

What is claimed is:

1. A recovery method for an ink jet recording apparatus comprising recording means for recording by discharging ink with bubbles formed by thermal energy applied to a heat acting area in an ink holding portion and energy supply means for supplying the thermal energy on said recording means, the method including performing a compulsory recovery in which more than $10^3$ predischarges are performed by supplying energy exceeding 1.48 times the minimum energy Eo necessary for producing the bubbles.

2. The recovery method according to claim 1, wherein said compulsory recovery performs said predischarges onto a supplied recording sheet.

3. The recovery method according to claim 2, wherein said recording means has a plurality of said heat acting areas and said predischarges onto said recording sheet are performed intermittently.

4. An ink jet recording apparatus comprising:
recording means for recording by discharging ink; and
means for supplying more than $10^3$ shots of energy exceeding 1.48 times the minimum energy Eo necessary for discharging ink with bubbles formed by thermal energy applied to a heat acting area in an ink holding portion of said recording means.

5. An ink jet recording apparatus
means for supplying energy to preheat a heat acting area in an ink holding portion; and
means for supplying more than $5 \times 10^5$ shots of energy exceeding 1.44 times the minimum energy Eo necessary for discharging ink with bubbles formed by thermal energy applied to said heat acting area.

6. An ink jet recording apparatus comprising a recording sheet conveying mechanism, a recording head having an ink holding portion and a heat acting area wherein bubbles are formed, and a recording head cap having therein an absorbing member; wherein:
said apparatus has a compulsory recovery mode during recording in which predischarge is performed into said recording head cap by supplying more than $10^3$ shots of energy exceeding 1.48 times the minimum energy Eo necessary for discharging ink with bubbles formed by thermal energy applied to said heat acting area; and
said apparatus has a compulsory recovery mode during non-recording in which discharge is performed onto a recording sheet conveyed from said recording sheet conveying mechanism by supplying more than $10^4$ shots of energy exceeding 1.48 times the minimum energy Eo necessary for discharging ink with bubbles formed by thermal energy applied to said heat acting area.

7. An ink jet recording apparatus comprising a recording sheet conveying mechanism and a recording head having an ink holding portion and a heat acting area wherein bubbles are formed; wherein:
said apparatus has a compulsory recovery mode during non-recording in which predischarge is performed onto a recording sheet conveyed from said recording sheet conveying mechanism by supplying more than $10^4$ shots of energy exceeding 1.48 times the minimum energy Eo necessary for discharging ink with bubbles formed by thermal energy applied to said heat acting area; and said apparatus has a compulsory recovery mode for maintenance in which predischarge is performed onto a recording sheet conveyed from said recording sheet conveying mechanism by supplying more than $10^5$ shots of energy exceeding 1.48 times the minimum energy Eo necessary for discharging ink with bubbles formed by thermal energy applied to said heat acting area, thereby supplying a larger amount of energy than in the compulsory recovery mode during non-recording.

8. An ink jet recording apparatus comprising:

a recording head having discharge energy generating elements and capable of performing a recovery operation of compulsorily discharging ink through discharge ports by driving said discharge energy generating elements at a discharge failure of said recording head as well as recording by discharging ink through said discharge ports by use of the energy obtained from said discharge energy generating elements; and driving energy control means for controlling the driving energy so that the amount of electrical energy for driving said discharge energy generating elements during the recovery operation may be more than or equal to 1.48 times the minimum amount of electrical energy necessary for driving said discharge energy generating elements during recording.

9. The ink jet recording apparatus according to claim 8, wherein said driving energy control means can output electrical pulses continuously or intermittently, and the amount of electrical energy can be varied in connection with the voltage of the electrical pulses and/or the width of the electrical pulses, and in connection with the number of electrical pulses to be output continuously or intermittently.

10. The ink jet recording apparatus according to claim 8, wherein the ink discharged during the recovery operation is received within cap member for said recording head and the ink can be exhausted from said cap member with suction means.

11. The ink jet recording apparatus according to claim 10, wherein an ink absorbing member for absorbing the ink discharged during the recovery operation is provided in said cap member.

12. The ink jet recording apparatus according to claim 8, wherein the ink discharged during the recovery operation is received within an ink receiving portion having an ink absorbing member provided apart from a cap member for said recording head and the ink can be exhausted from said ink receiving portion with suction means.

13. The ink jet recording apparatus according to claim 8, wherein the electrical energy to be supplied to said discharge energy elements at discharge failure of said recording head is output continuously or intermittently and the number of pulses ranges from $3 \times 10^5$ to $10^6$.

14. A recovery method for an ink jet recording apparatus comprising a recording head having discharge energy generating elements and capable of recording by discharging ink droplets through discharge ports by use of the energy obtained from said discharge energy generating elements, wherein at discharge failure of said recording head, ink is compulsory discharged through said discharge ports by supplying more than or equal to 1.48 times the minimum amount of electrical energy necessary for discharging ink using said discharge energy generating elements during recording.

15. The recovery method according to claim 14, wherein the recovery operation performed at discharge failure of said recording head is conducted at a higher temperature than a temperature reached by self-heating of said recording head.

16. The recovery method according to claim 14, wherein the electrical energy to be supplied to said discharge energy generating elements at discharge failure of said recording head is output continuously or intermittently and the number of pulses ranges from $3 \times 10^5$ to $10^6$.

17. The recovery method according to claim 14, wherein the amount of electrical energy can be varied in connection with the voltage of electrical pulses and/or the width of electrical pulses, and in connection with the number of electrical pulses to be output continuously or intermittently.

* * * * *

UNITED STATES PATENT AND TRADEMARK OFFICE
CERTIFICATE OF CORRECTION

PATENT NO. : 5,289,207
DATED : February 22, 1994
INVENTOR(S) : ISAO EBISAWA

It is certified that error appears in the above-indentified patent and that said Letters Patent is hereby corrected as shown below:

COLUMN 1

Line 13, "(including either of" should read --(either--.

COLUMN 4

Line 7, "least" should read --little--.

COLUMN 6

Line 2, "thereinafter" should read --(hereinafter--.

COLUMN 7

Line 26, "the undischarge" should read --nondischarge--.
Line 37, "voltage." should read --voltage,--.

COLUMN 8

Line 19, "driving," should read --driving--.
Line 33, "perfomred" should read --performed--.

COLUMN 10

Line 26, "a" should be deleted.

COLUMN 11

Line 60, "an" should read --a--.

COLUMN 12

Line 7, "the undischarge" should read --nondischarge--.

UNITED STATES PATENT AND TRADEMARK OFFICE
CERTIFICATE OF CORRECTION

PATENT NO. : 5,289,207
DATED : February 22, 1994
INVENTOR(S) : ISAO EBISAWA

It is certified that error appears in the above-indentified patent and that said Letters Patent is hereby corrected as shown below:

COLUMN 14

Line 49, "preferably" should read --preferable--.

COLUMN 18

Line 30, "apparatus" should read --apparatus comprising:--.

COLUMN 19

Line 40, "within" should read --within a--.

COLUMN 20

Line 22, "compulsory" should read --compulsorily--.

Signed and Sealed this

Sixth Day of September, 1994

Attest:

Attesting Officer

BRUCE LEHMAN
Commissioner of Patents and Trademarks